United States Patent [19]

Bolash et al.

[11] Patent Number: 4,788,484

[45] Date of Patent: Nov. 29, 1988

[54] METHOD AND APPARATUS FOR DRIVING A STEPPER MOTOR WITH MULTIPLE VOLTAGES

[75] Inventors: John P. Bolash; Joel G. Goodwin, both of Concord; Nicholas J. Krull, Charlotte, all of N.C.

[73] Assignee: International Business Machines Corp., Armonk, N.Y.

[21] Appl. No.: 89,688

[22] Filed: Aug. 26, 1987

[51] Int. Cl.[4] ............................................. H02P 8/00
[52] U.S. Cl. ..................................... 318/696; 318/685
[58] Field of Search ................................. 318/696, 685

[56] References Cited

U.S. PATENT DOCUMENTS

| | | | |
|---|---|---|---|
| 3,445,741 | 5/1969 | Gerber | 318/138 |
| 4,490,665 | 12/1984 | Meyer et al. | 318/696 |
| 4,661,755 | 4/1987 | Suzuki | 318/696 |

OTHER PUBLICATIONS

Increased Speed and Torque Capability From A Stepper Motor, J. G. Barcomb, IBM Technical Disclosure Bulletin, vol. 13, No. 10, Mar. 1971.
Stepper Motor Drive Circuit, J. G. Barcomb and R. J. Cosimano, IBM Technical Disclosure Bulletin, vol. 13, No. 10, Mar. 1971.
Phase Drive of a Variable-Reluctance Motor, J. P. Pawletko, IBM Tech. Discl. Bulletin, vol. 18, No. 1, Jun. 85–88.
High Performance Pedestal Driver with Power Save Option for Stepper Motors, J. E. Bateson, S. E. Bigbie and D. F. Dogen, IBM Technical Disclosure Bulletin, vol. 22, No. 12, May 1980, pp. 5243–5250.
Step Motor Chopper Driver, P. A. Cook and J. W. Raider, IBM Technical Disclosure Bulletin, vol. 24, No. 1B, Jun. 1981.
Step Motor Drive Circuitry, Warner Electric Brake & Clutch Co., Boloit, WS, Copyright, 1979, Rev. 1/80, Chapter IV, pp. 1–22.

Primary Examiner—William M. Shoop, Jr.
Assistant Examiner—Saul M. Bergmann
Attorney, Agent, or Firm—Bell, Seltzer, Park & Gibson

[57] ABSTRACT

The invention is for an improved method and apparatus of driving a stepper motor with multiple voltages. A first voltage is applied to the step motor winding for a driving phase, and a second higher voltage is applied to the same motor winding during the same driving phase just prior to and substantially until the time that the winding is de-energized.

24 Claims, 2 Drawing Sheets

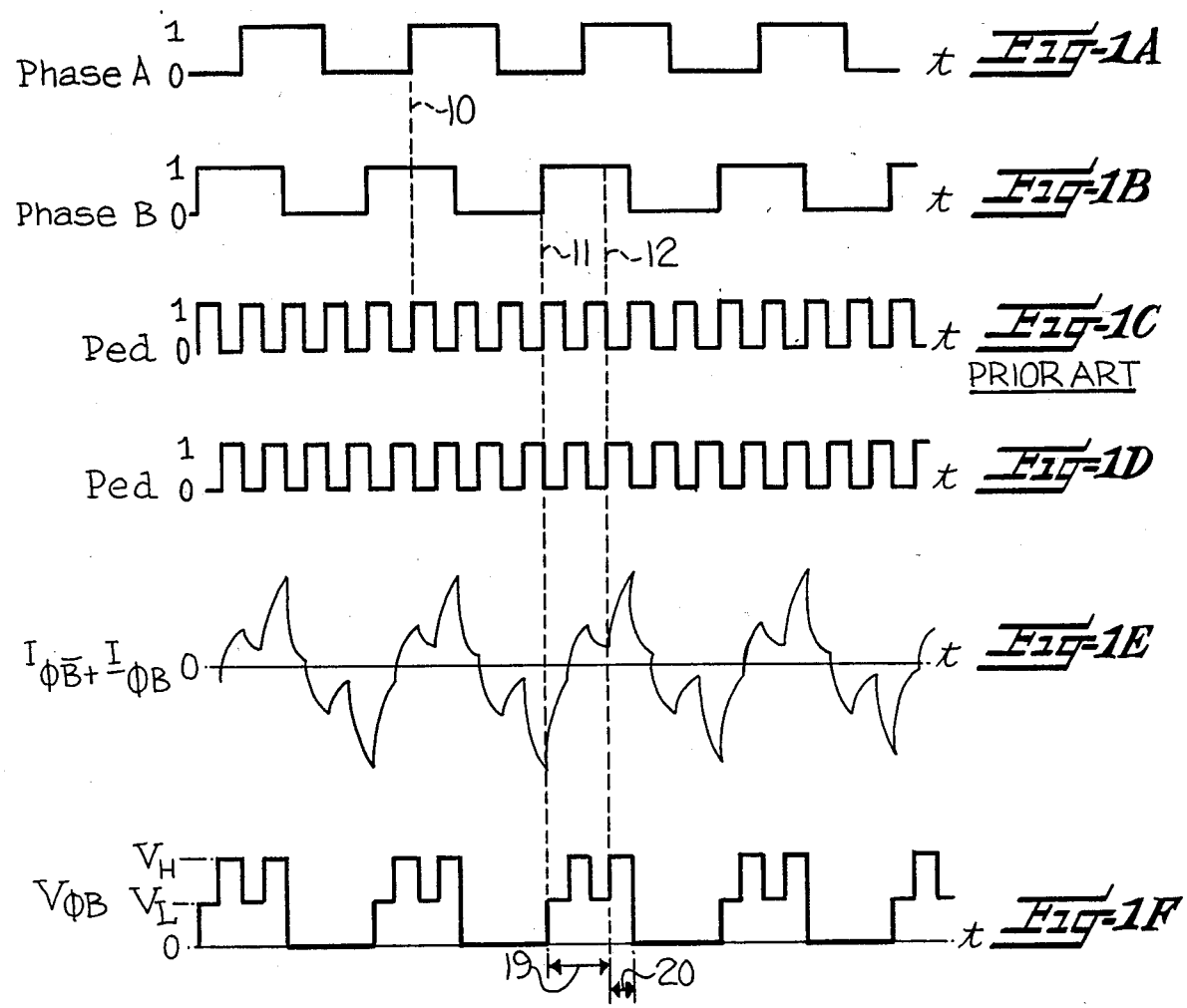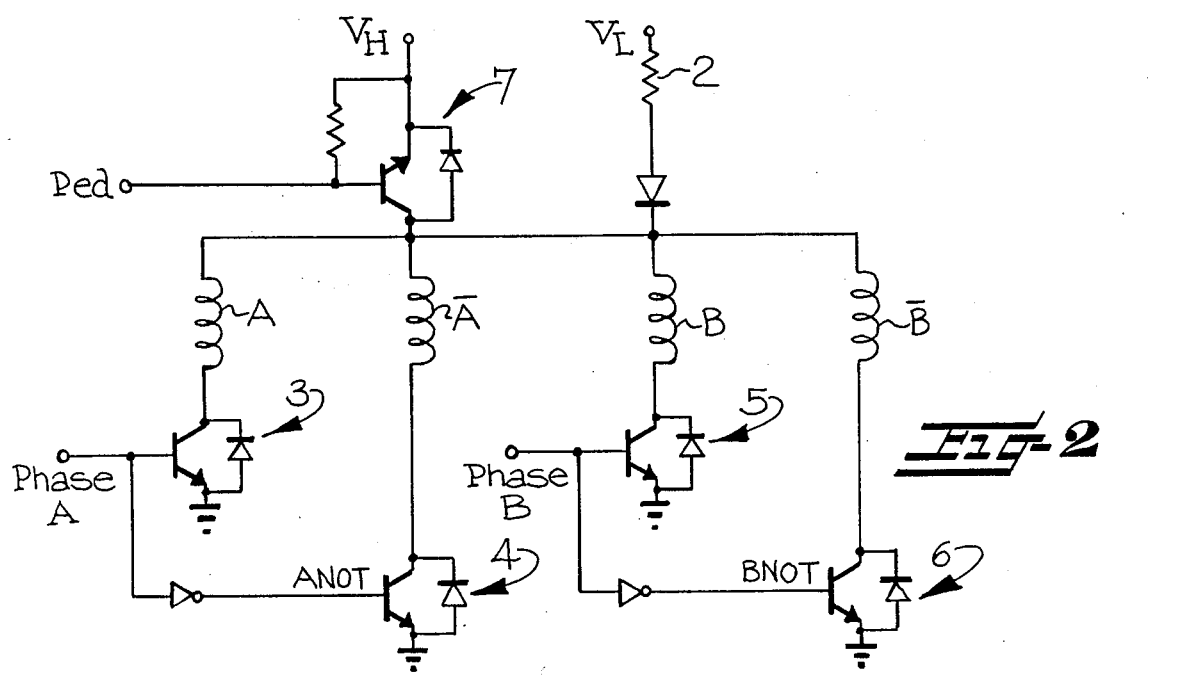

METHOD AND APPARATUS FOR DRIVING A STEPPER MOTOR WITH MULTIPLE VOLTAGES

FIELD OF THE INVENTION

This invention relates generally to a method and apparatus for driving electric stepper motors with multiple voltages. Different voltages are applied at different times of the driving phase to maximize power and torque output, yet protect the motor windings from damage that might result from excess current and heat build up.

BACKGROUND OF THE INVENTION

Stepper motors are motors whose normal operation consists of discrete rotational motions, or steps, of the output shaft. The physical arrangement and number of stator teeth and rotor teeth determine the number of degrees of output shaft rotation per step. Each rotational step is of essentially uniform magnitude, i.e. the same number of arc degrees, rather than the continuous spinning that is characteristic of a continuous duty motor. Properly driven, a stepper motor can also operate at different velocities and with different torque outputs. And, since they index in fixed annular increments rather than continuous motion, a stepper motor may be advanced to a particular position and magnetically latched at the precise point to which it is stepped. Thus, stepper motors may act as a transductor to convert digital electric signals from a microprocessor or digital computer to mechanical motion.

Each digital input signal that excites the stepper motor typically causes it to increment through one precise step or angle of motion. A controller for a stepper motor generates at the appropriate time the digital excitation pulses of a predetermined frequency, duration and magnitude to match the desired output. These pulses are applied to and excite each stepper motor winding in turn with a certain energy during the driving phase to obtain the desired discrete starting, rotation and stopping motion. Typically, a voltage pulse is applied to the motor winding for a predetermined time to drive current through the winding. The resulting magnetomotive forces cause the rotor to rotate, and the motor generates a counter EMF as the shaft begins to spin.

A stepper motor winding is a typical inductive load which appears as a series connected inductance and resistance. Thus, when a voltage is applied to the motor winding, the current rises exponentially with the time constant of L/R (inductance/resistance) seconds. Conventional wisdom teaches that the winding current should rise as quickly as possible when the motor winding is first energized during a driving phase. This purportedly increases and improves the speed, power and torque output characteristics of the motor. And, since the current rise for a typical inductive load is directly proportional to the applied voltage, a higher than rated voltage is applied to a winding when it is first energized during each driving phase or step. However, the steady state current must be maintained below a certain level to prevent damage to the motor, so the voltage is typically reduced after a certain period of time.

The prior art discloses numerous dual voltage drives which use a high voltage to build current in the windings and then switch to a lower voltage to either decrease current flow or maintain a minimum current flow. This reduces circuit power dissipation and improves performance. Such a drive is often used in "move and hold" applications where a fast rise to a high current is necessary to rotate the shaft, but a small current is sufficient to hold it in place. Due to the increasing complexity and sophistication of stepper motor drive circuits, and the extreme cost and hardship associated with wholesale replacement of hardware already in place, it is desirable to improve stepper motor performance with minimal changes to existing drive circuits.

It is an object of the present invention to provide an improved method and apparatus for driving a stepper motor with multiple voltages.

It is a further object of the present invention to provide a method and apparatus for driving a stepper motor that increases the torque output without increasing the voltages applied to the stepper motor windings. This allows stable motor operation using lower voltage power supplies.

It is a still further object of the present invention to provide a method and apparatus for driving a stepper motor with multiple excitations that provide improved power output by changing the timing of the excitation of the motor windings.

These and other objects are accomplished by the present invention which drives the stepper motor by applying a first excitation to a motor winding and sequentially applying a second excitation having a voltage higher than the first excitation to the same winding during the same driving phase. The second excitation is applied at least just prior to and continuing substantially until the time that the winding is de-energized at the end of the driving phase.

BRIEF DESCRIPTION OF THE DRAWINGS

FIGS. 1A, 1B and 1D illustrate the levels of the logic signals with respect to time as applied to a dual voltage or pedestal driving circuit for a stepper motor, such as illustrated in FIG. 2, according to the present invention.

FIG. 1C illustrates the levels of the logic signals of the prior art that correspond to FIG. 1D.

FIG. 1E illustrates the sum of current flows with respect to time in motor windings using the logic signals of FIGS. 1A, 1B, and 1D.

FIG. 1F illustrates the voltages applied to a motor winding in phase B with respect to time using the logic signals of FIGS. 1A, 1B, and 1D.

FIG. 2 is an electric schematic diagram illustrating a basic dual voltage or pedestal drive circuit for a stepper motor.

DESCRIPTION OF A PREFERRED EMBODIMENT

Figure 3:
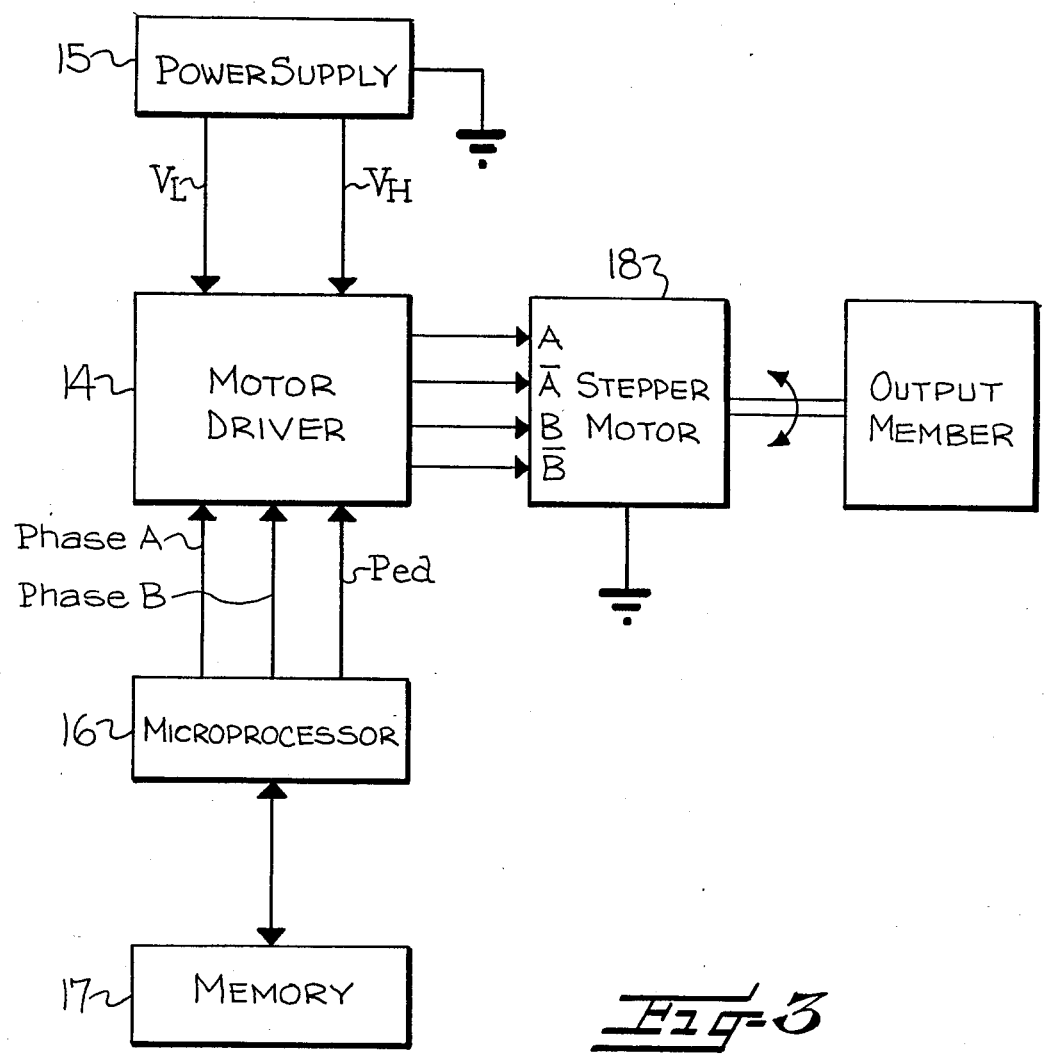
FIG. 3 is a schematic block diagram illustrating a basic dual voltage or pedestal drive circuit for a stepper motor.

FIGS. 1A, 1B and 1D illustrate the digital logic signals applied to the inputs of a dual voltage or pedestal driving circuit for a stepper motor, as shown in FIGS. 2 and 3. The circuit applies a low voltage $V_L$ or high voltage $V_H$ to the windings of a stepper motor in a timed sequence to achieve the desired step rotation. Such circuits are widely used and well known.

A motor driver 14 receives energy and logic signals to sequentially energize a stepper motor as shown in FIG. 3. A power supply or external source 15 provides a low voltage $V_L$ and high voltage $V_H$. A microprocessor 16 generates the logic signals phase A, phase B and Ped in response to instructions stored in memory 17 or some other signal. These logic signals operate switching elements in the motor driver that selectively gate the high and low voltages and apply them to the windings of the stepper motor 18, represented by A, $\overline{A}$, B and $\overline{B}$. A typical circuit for a motor driver and motor is illustrated in FIG. 2.

The low voltage $V_L$ is available for selective application to all four motor windings A, $\overline{A}$, B, $\overline{B}$. The current flow from $V_L$ is limited by resistor 2. $V_L$ is sequentially gated to selected motor windings by the application of the logic signals of FIGS. 1A and 1B to the phase A and phase B inputs. The phase A logic signal directly gates transistor switch 3, and is inverted to ANOT to gate transistor switch 4. Similarly, the phase B logic signal directly gates transistor switch 5, and is inverted to BNOT to gate transistor switch 6.

The high voltage $V_H$ is also selectively applied to the motor windings A, $\overline{A}$, B, $\overline{B}$. $V_H$ is sequentially gated to selected motor windings by the application of logic signals to the phase A and phase B inputs and to the Ped input. The phase A and phase B logic signals gate directly or indirectly transistor switches 3–6 as described above, and the Ped logic signal directly gates transistor switch 7. In the prior art, $V_H$ was applied when the winding was initially energized and would continue for a predetermined period of time. See the dotted line 10 bridging FIGS. 1A and 1C, which reflects that when winding A is initially energized, it is excited with the high voltage $V_H$ for a predetermined period of time established by the duration of the Ped pulse, followed by the application of a lower voltage $V_L$ from the time the Ped pulse terminates (i.e. goes low or to logic 0) until either a succeeding Ped pulse is applied or the phase A signal terminates. This induced a high rate of initial current rise, but later limited it to protect the motor. Each winding would be sequentially energized in the same VH then $V_L$ pattern until sufficient rotation had occurred.

The invention contemplates the advantage of using the same driving circuit, but it applies the high voltage excitation at a different time, namely, just prior to and continuing substantially until the time that the winding is de-energized or the phase changes. Referring again to FIG. 2, when motor winding B is to be excited for a driving phase, the logic signal for phase B goes high, as illustrated in FIG. 1B at dotted line 11, for the first excitation 19. However, the logic signal Ped is low, as shown in FIG. 1D at dotted line 11, so the voltage applied to winding B initially is a low voltage, rather than a high voltage as taught in the prior art. Just prior to and continuing substantially until time that winding B is de-energized at the end of a driving phase, a voltage higher than the first voltage is applied to winding B during the same driving phase, as illustrated by FIG. 1D at dotted line 12, for the second excitation 20. This sequence continues for each driving phase, as illustrated.

The dual level pedestal voltages applied to winding B with respect to time are illustrated in FIG. 1F, and the corresponding current flow is illustrated in FIG. 1E. The timing and pulse shapes for the logic signals or voltage excitations may be varied to optimize motor output to a specific application. For instance, the durations of $V_L$ and $V_H$ excitations are illustrated as being generally equal, although each may vary. Similarly, the voltages applied during either excitation may be other than step voltages, such as a ramp or H configuration or some other waveform, provided the second, or last excitation in the driving phase has a voltage higher than the first excitation just prior to the time that the winding is de-energized. The pulse shaping may aid in eliminating the undesirable effects of eddy currents, microscopic circulating currents induced in the conductive core of an inductor, resistance, changes in impedance with temperature, and changes in coil inductance as a function of frequency, temperature or current.

Test data has established a clear increase in torque by changing the timing of the high voltage excitation according to the invention.

| High Voltage Pulse Width In Microseconds | Prior Art Pulse Timing | Invention New Pulse Timing |
| --- | --- | --- |
| 1.0 | 5.6 Oz/In. at 290 MA | 7.4 Oz/In. at 390 MA |
| 1.1 | 7.1 Oz/In. at 330 MA | 8.4 Oz/In. at 450 MA |
| 1.2 | 8.1 Oz/In. at 390 MA | 9.8 Oz/In. at 525 MA |

It is not fully understood why this time shifting of the application of the high voltage produces the improved results, but it is believed that the application of the high voltage excitation just prior to and continuing substantially until the time that the winding is de-energized most efficiently overcomes the back EMF of the motor.

While the invention has been described in connection with a preferred method and apparatus, it is to be understood that it is intended to be illustrative of the preferred embodiment and not to limit the invention. It is intended that all alternatives, modifications and equivalents are to be included within the spirit and scope of the invention as defined by the appended claims.

What is claimed is:

1. A method for driving a stepper motor with multiple excitations, the method comprising
   applying a first excitation to a motor winding during a driving phase; and
   subsequently applying a second excitation having a voltage higher than the first excitation to the same motor winding during the same driving phase and at least just prior to and continuing substantially until the time that the winding is de-energized at the end of the driving phase.

2. The method of claim 1 wherein the step of applying a first excitation comprises applying the first excitation when the winding is initially energized.

3. The method of claim 1 wherein the step of applying a first excitation comprises applying the first excitation to a motor winding for a predetermined period of time.

4. The method of claim 1 wherein the step of applying a first excitation comprises applying multiple voltages.

5. The method of claim 1 wherein the step of applying a first excitation comprises applying at least one pulse having a predetermined voltage and duration.

6. The method of claim 1 wherein the step of subsequently applying a second excitation comprises applying a second excitation upon termination of the first excitation.

7. The method of claim 1 wherein the step of applying a first excitation comprises applying the first excitation when the winding is initially energized and for a predetermined period of time thereafter, and the step of subsequently applying a second excitation comprises applying a second excitation upon termination of the first excitation.

8. The method of claim 1 wherein the step of subsequently applying a second excitation comprises applying at least one pulse having a predetermined voltage.

9. The method of claim 1 wherein the steps of applying first and second excitations comprise applying the first and second excitations during each driving phase.

10. A method for driving a stepper motor with a plurality of excitations, the method comprising applying a higher voltage excitation to the motor winding during a driving phase just prior to and continuing substantially until the time that the winding is de-energized at the end of the driving phase, the higher voltage excitation being of a voltage higher than the immediately preceding voltage applied to the motor winding during the same of the driving phase.

11. The method of claim 10 wherein the step of applying a higher voltage excitation comprises applying a higher voltage electric pulse.

12. The method of claim 10 wherein the step of applying a higher voltage excitation comprises applying the higher voltage excitation during each driving phase.

13. Apparatus for driving a stepper motor with multiple excitations, the apparatus comprising
means for applying a first excitation to a motor winding during a driving phase; and
means for subsequently applying a second excitation having a voltage higher than the first excitation to the same motor winding during the same driving phase and at least just prior to and continuing substantially until the time that the winding is deenergized at the end of the driving phase.

14. The apparatus of claim 13 wherein the means for applying a first excitation comprises means for applying the first excitation when the winding is initially energized.

15. The apparatus of claim 13 wherein the means for applying a first excitation comprises means for applying the first excitation to a motor winding for a predetermined period of time.

16. The apparatus of claim 13 wherein the means for applying a first excitation comprises means for applying multiple voltages.

17. The apparatus of claim 13 wherein the means for applying a first excitation comprises means for applying at least one pulse having a predetermined voltage and duration.

18. The apparatus of claim 13 wherein the means for subsequently applying a second excitation comprises means for applying a second excitation upon termination of the first excitation.

19. The apparatus of claim 13 wherein the means for subsequently applying a second excitation comprises means for applying at least one pulse having a predetermined voltage.

20. The apparatus of claim 13 wherein the means for applying a first voltage comprises means for applying the first voltage when the winding is initially energized and for a predetermined period of time thereafter, and the means for subsequently applying a second voltage comprises means for applying a second voltage upon termination of the first voltage.

21. The apparatus of claim 13 wherein the means for applying the first excitation and means for subsequently applying a second excitation each comprise means for applying the first and second excitations during each driving phase.

22. Apparatus for driving a stepper motor with a plurality of voltages, the apparatus comprising means for applying a higher voltage to the motor winding during a driving phase just prior to and continuing substantially until time that the winding is de-energized at the end of the driving phase, the higher voltage being of a voltage higher than the immediately preceding voltage applied to the motor winding during the same the driving phase.

23. Apparatus for driving a multi-coil stepper motor with multiple excitations, the apparatus comprising
a source of high voltage;
a source of low voltage;
switching means for selectively applying the high and low voltages to selected stepper motor windings in response to control signals; and
control means for applying a predetermined timed sequence of control signals to said switching means, said switching means applying a low voltage excitation to a selected stepper motor winding during a driving phase and subsequently applying a high voltage excitation to the same motor winding during the same driving phase at least just prior to and continuing substantially until time that the winding is de-energized at the end of driving phase.

24. The apparatus of claim 23 wherein said control means comprises means for causing said switching means to apply a low voltage excitation for a predetermined time and a high voltage excitation upon termination of the low voltage excitation.

* * * * *

UNITED STATES PATENT AND TRADEMARK OFFICE
CERTIFICATE OF CORRECTION

PATENT NO. : 4,788,484

DATED : Nov. 29, 1988

INVENTOR(S) : Bolash et al.

It is certified that error appears in the above-identified patent and that said Letters Patent is hereby corrected as shown below:

```
IN THE ABSTRACT, Line 6, after "and" insert -- continuing --.
Column 3, Line 38, "VH" should read -- V_H --.
Column 4, Line 3, after "to" insert -- and continuing
    substantially until --.
Column 5, Line 34, "deenergized" should read -- de-energized --.
Column 6, Line 29, delete "the".
Column 6, Line 44, after "until" insert -- the --.
Column 6, Line 45, after "of" insert -- the --.
```

Signed and Sealed this

Twenty-fifth Day of April, 1989

Attest:

DONALD J. QUIGG

Attesting Officer

Commissioner of Patents and Trademarks